US007318432B2

(12) United States Patent
Rekstad (10) Patent No.: US 7,318,432 B2
(45) Date of Patent: Jan. 15, 2008

(54) SOLAR COLLECTOR PLATE METHOD FOR SAFEGUARDING THE OPERATION OF A SOLAR COLLECTOR AND METHOD FOR MANUFACTURING A SOLAR COLLECTOR PLATE

(75) Inventor: John Rekstad, Fjellhamar (NO)

(73) Assignee: Solarnor AS, Olso (NO)

( * ) Notice: Subject to any disclaimer, the term of this patent is extended or adjusted under 35 U.S.C. 154(b) by 0 days.

(21) Appl. No.: 10/492,035

(22) PCT Filed: Oct. 11, 2002

(86) PCT No.: PCT/NO02/00368

§ 371 (c)(1), (2), (4) Date: May 10, 2004

(87) PCT Pub. No.: WO03/031880

PCT Pub. Date: Apr. 17, 2003

(65) Prior Publication Data

US 2004/0261787 A1 Dec. 30, 2004

(30) Foreign Application Priority Data

Oct. 12, 2001 (NO) .................................. 20014973

(51) Int. Cl.
*F24J 2/04* (2006.01)
*F24J 2/20* (2006.01)
*F24J 2/24* (2006.01)
*F24J 2/44* (2006.01)
*F24J 2/40* (2006.01)

(52) U.S. Cl. ...................... 126/569; 126/651; 126/669; 126/707; 126/711; 126/638; 126/706; 126/621; 126/671; 165/134.1; 165/104.32

(58) Field of Classification Search ................. 126/651, 126/652, 707, 711, 638, 706, 621, 570, 569, 126/660, 669, 671; 264/162, 177.1, 209.1; 165/132, 134.1, 104.32
See application file for complete search history.

(56) References Cited

U.S. PATENT DOCUMENTS

| 1,644,270 | A | * | 10/1927 | Paone ........................ 165/110 |
| 3,076,450 | A | * | 2/1963 | Gough et al. ............... 126/672 |
| 3,958,554 | A | * | 5/1976 | Schmidt ...................... 126/651 |
| 3,987,782 | A | * | 10/1976 | Meier, Jr. ................... 126/638 |
| 4,011,905 | A | * | 3/1977 | Millard ....................... 165/175 |
| 4,062,352 | A | * | 12/1977 | Lesk ........................... 126/668 |
| 4,114,597 | A | * | 9/1978 | Erb ............................ 126/665 |
| 4,158,686 | A | * | 6/1979 | Boeckmann ............... 264/45.7 |
| 4,159,889 | A | * | 7/1979 | Yagi et al. .................... 425/71 |

(Continued)

FOREIGN PATENT DOCUMENTS

JP 57092661 A * 6/1982

(Continued)

*Primary Examiner*—Carl D. Price
(74) *Attorney, Agent, or Firm*—Ladas & Parry LLP (57) ABSTRACT

A solar collector plate (2) has a solar radiation receiving front absorber plane (3) that is wiped at its rear side by a cooling liquid (4) flowing in channels (5). Cavities (7), preferably behind the channels (5) and integrated in the solar collector plate (2), and that can be closed off by the very liquid flow (4), provide a closed air volume that gives a dampening effect regarding kickbacks and pressure transients in the liquid (4).

13 Claims, 5 Drawing Sheets

U.S. PATENT DOCUMENTS

| | | | | |
|---|---|---|---|---|
| 4,169,460 A | * | 10/1979 | Popovich et al. | 126/589 |
| 4,193,543 A | * | 3/1980 | Viesturs et al. | 126/570 |
| 4,217,885 A | * | 8/1980 | Bowles | 126/672 |
| 4,221,210 A | * | 9/1980 | Cvijanovich | 126/591 |
| 4,239,035 A | * | 12/1980 | Brooks et al. | 126/678 |
| 4,240,405 A | * | 12/1980 | French | 126/637 |
| 4,245,617 A | * | 1/1981 | Buckley | 126/638 |
| 4,271,103 A | * | 6/1981 | McAlister | 264/1.7 |
| 4,341,202 A | * | 7/1982 | French | 126/584 |
| RE31,321 E | * | 7/1983 | Harrison | 126/585 |
| 4,396,643 A | * | 8/1983 | Kuehn et al. | 427/160 |
| 4,414,961 A | * | 11/1983 | Luebke | 126/646 |
| 4,442,826 A | * | 4/1984 | Pleasants | 126/400 |
| 4,458,669 A | * | 7/1984 | Lee | 126/618 |
| 4,491,174 A | * | 1/1985 | Villeval | 165/104.32 |
| 5,460,164 A | * | 10/1995 | Rekstad et al. | 126/714 |
| 5,645,044 A | * | 7/1997 | Reiala | 126/655 |
| 6,014,967 A | * | 1/2000 | Rekstad et al. | 126/592 |
| 6,082,354 A | * | 7/2000 | Rekstad | 126/674 |
| 6,821,509 B2 | * | 11/2004 | Soane et al. | 424/70.11 |

FOREIGN PATENT DOCUMENTS

JP 58224265 A * 12/1983

* cited by examiner

SOLAR COLLECTOR PLATE METHOD FOR SAFEGUARDING THE OPERATION OF A SOLAR COLLECTOR AND METHOD FOR MANUFACTURING A SOLAR COLLECTOR PLATE

BACKGROUND OF THE INVENTION

1. Field of the Invention

The present invention relates to an improved solar collector, and more in particular a special solar collector plate, a method for manufacturing such a plate, and a method for safeguarding the operation/performance of a solar collector plate.

2. Description of the Related Art

A solar collector is a device that converts energy in solar radiation, to heat at a utilizable temperature. The energy conversion takes place in an absorber. This absorber is designed in such a manner that the radiation is absorbed and converted to thermal energy, and the energy is transferred to a heat-carrying medium that transports it away from the solar collector plate absorber and into a heat store, or to immediate utilization. The heat-carrying medium may be a gas, e.g. air, or a liquid, e.g. water. The solar collector plate is usually insulated, and on the absorber side facing the sun, one will often use insulation that is transparent to sunlight, for instance glass or transparent plastics, and on the plate side facing away from the sun, one may use mineral wool or some other solid insulation material that is temperature resistant. A flat solar collector has a cover plate, and most often an absorber that is flat, i.e. there is no focusing of sunlight in toward the absorber. Flat solar collectors without a cover plate in front of the absorber, are also in use.

The present invention concerns a solar collector plate with absorber in a flat solar collector. Most flat solar collectors use absorbers manufactured from a metal, however absorbers in plastic materials can also be found in the market. Most plastic materials used in solar collectors have a softening temperature that is too low to make them suitable in flat solar collectors with a cover plate, Several types of plastic solar collectors without cover plate are used for low temperature purposes, for instance heating of swimming pools. However, some absorbers are manufactured in plastic materials that can withstand temperatures as high as 150-160° C., and these absorbers are suitable also for solar collectors with an insulating cover plate.

The reason for using a plastic material in the absorber, is primarily favourable large-scale manufacturing costs in comparison with metal absorbers. The manufacturing cost is a critical parameter, since the use of solar energy is primarily dictated by whether it may turn out to be competitive regarding price, compared to the more conventional energy sources/carriers. However, plastic materials that are able to satisfy the temperature requirements in a solar collector with a cover plate, are relatively costly, and therefore competitiveness presupposes a design that is able to reduce the use of plastic material per unit area to a minimum. The capability of the plastic materials regarding withstanding the strains to which an absorber in a flat solar collector is subjected, puts restrictions on the combination of mechanical, thermal and radiation-related influences. The less plastic material used per unit area, the stricter these requirements will be.

One type of mechanical strain for which the plastic materials are vulnerable, especially in combination with a high temperature, arises if there are pressurized channels or cavities inside the solar collector plate.

Since solar collectors at northern latitudes are often arranged standing/slanting, and the coolant is often brought up to a certain height by means of pumping, is pressures will usually arise, and in some cases there will appear rapid pressure changes, for instance when shutting down or starting up, which pressure changes may be harmful to the solar collector or to the whole liquid system. The main problem that the present invention tries to solve, is to equalize harmful pressure transients and kickbacks.

Liquid filling of the channels is necessary with regard to heat transfer, since the plastic material has a very small coefficient of thermal conductivity ($\lambda$=0.1–0.3 W/m deg). When the liquid gets in direct contact with the underside of the thin plastic surface where the radiation energy is deposited as heat, the necessary transport path for heat through the plastic material is minimized.

However, the hydrostatic pressure may then become large inside the channels.

In Norwegian patent publication no. 179925 in the name John Rekstad, it is disclosed how particles of a certain size, arranged in the liquid-conducting channels in a plastic solar collector plate, create capillary forces that make it possible to establish liquid-filled solar collector plates without simultaneously building up a liquid pressure inside the liquid-conducting channels.

However, the granulates in the channels of the solar collector plate entail production technical disadvantages that also lead to cost-related consequences. They also contribute to increased weight, which causes additional strain on the plastic material, and is a drawback in assembling and transporting. If the granulates are manufactured from another material than the rest of the solar collector plate, they must be removed prior to a possible material recovery when the plate shall be destructed. Recyclability is today an important characteristic when judging solar collectors.

One further problem solved by the present invention, is eliminating the granulate, but nevertheless making it possible to utilize a capillary effect in the channels in order to diminish pressure problems.

SUMMARY OF THE INVENTION

Hence, in accordance with the invention there is provided a solar collector plate for a solar collector, which solar collector plate has a radiation receiving forward absorber plane where radiation energy is converted to thermal energy that is absorbed by a flowing cooling liquid, the solar collector plate having cooling liquid transport channels behind and close to the absorber plane. The solar collector plate in accordance with the invention is characterized in that it has at least one cavity connected with the solar collector plate and with an open end only toward the cooling liquid transport channels at the inlet to or outlet from the solar collector plate, for closing in a dampening air volume in the cavity by means of flowing cooling liquid.

Preferably, the solar collector plate in accordance with the invention is a stiff and uniform plate with internal, integrated transport channels for cooling liquid, where the at least one cavity is also an integrated part behind the channels. The plate can be designed with three main material planes in parallel, namely the absorber plane, an intermediate plane and a rear strength plane, as well as parallel walls arranged perpendicularly therebetween, which parallel walls define between themselves and between the absorber plane and the intermediate plane the above mentioned channels, the parallel walls constituting supporting walls between the intermediate plane and the strength plane and forming the above mentioned cavities, which cavities run parallel to the channels, the walls defining a longitudinal direction for the solar collector plate, which longitudinal direction is the same as the transport direction for the cooling liquid.

Besides, the solar collector plate in accordance with the invention is preferably extruded and manufactured in a temperature and water resistant plastic material, since the cooling liquid will most often be water.

In a first embodiment among two embodiments on equal footing, the cross-sectional dimensions and the internal surface structure of the cooling liquid transport channels can be adapted to provide a capillary effect, for use in capillary effect assisted gravitation flow for the cooling liquid through the channels when the solar collector plate is arranged with the channels in a downward slanting position and with the open end of the cavities lowest, the cooling liquid being let in at an upper edge and closing the lower open end of the cavities by means of a liquid curtain. The channels in the solar collector plate may then have internal surfaces that have been roughened in a special finishing step in an extrusion process. Optionally, the internal surfaces may have been roughened by injecting a surface coating subsequent to extrusion of the plate.

In the other one of the two equally footed embodiments, the open end of the cavities is arranged at the inlet of cooling liquid transport channels to the solar collector plate, and the plate is adapted to be arranged in a slanting position with the inlet lowest, for an operating mode with an upward directed and pumped liquid transport, and the cavities are then adapted to receive, in a lower part, an eddying part of the flowing cooling liquid.

The invention also comprises a method for safeguarding the operation of a solar collector that includes a solar collector plate with a radiation receiving forward absorber plane where solar radiation energy is converted to thermal energy that is absorbed by a flowing cooling liquid, and the solar collector plate has transport channels for cooling liquid behind and close to the absorber plane. The method of the invention is characterized in that, in operation, the flowing cooling liquid is made to close an open end of at least one cavity connected with the solar collector plate, and that an air volume thereby closed off inside the at least one cavity, dampens possible kickbacks and pressure transients in the cooling liquid.

In a preferred embodiment of the method in accordance with the invention, the cooling liquid closes off cavities that constitute an internal and integrated section of a stiff and uniform solar collector plate with internally integrated transport channels for cooling liquid in front of the cavities. One of two preferred embodiments is then that the solar collector is arranged with a slanting solar collector plate having inlet on the top, and outlet lowest from the cooling liquid transport channels, and that the cavities behind the channels are closed by a gravity-driven liquid curtain at the outlet. Preferably, the flowing cooling liquid in the channels are then transported down toward the outlet by gravity assisted by capillary effect, the channels having been provided with capillary effect by dimensioning of cross sections and by surface preparation internally.

However, in the other preferred embodiment, the solar collector is arranged with a slanting solar collector plate and with inlet lowest to, and outlet at the top from the cooling liquid transport channels, the cooling liquid is transported upward in the channels by pumping, and the cavities behind the channels are then closed off by an eddying part of the flowing cooling liquid.

The present invention also comprises an aspect with a method for manufacturing a solar collector plate for use in a solar collector, and which is at the same time suitable as a strong building board, and the solar collector plate shall comprise a solar radiation receiving forward absorber plane and transport channels for cooling liquid behind and close to the absorber plane. This method is characterized in that the plate is extruded with an intermediate plane and a rear strength plane parallel to the absorber plane, and with a number of walls standing between the planes and possibly as boundary walls on two outsides, so that the above mentioned cooling liquid transport channels are provided between the walls and the absorber plane and the intermediate plane, and a plurality of cavities are formed behind the channels between the walls and the intermediate plane and the strength plane, and in that a certain length of straight cut extrudate is provided, along a cut side, with a closure wall that closes the cavities without closing the channels, while the opposite cut side remains open.

Preferably, the plate is extruded with a substantially greater distance between the rear strength plane the intermediate plane, than between the absorber plane and the intermediate plane, for instance in order of magnitude 1 cm and 1 mm, respectively. The channels can be roughened on inside surfaces in extrusion, by using a special finishing tool. Optionally, the inside surfaces of the channels can by sprayed, subsequent to finished extrusion, to provide a roughened surface.

BRIEF OF THE DRAWING FIGURES

In the following, the invention shall be discussed in closer detail by going through non-limitative embodiment examples, and at the same time it is referred to the appended drawings, where.

DETAILED DESCRIPTION OF THE PREFERRED EMBODIMENTS

Figure 1:
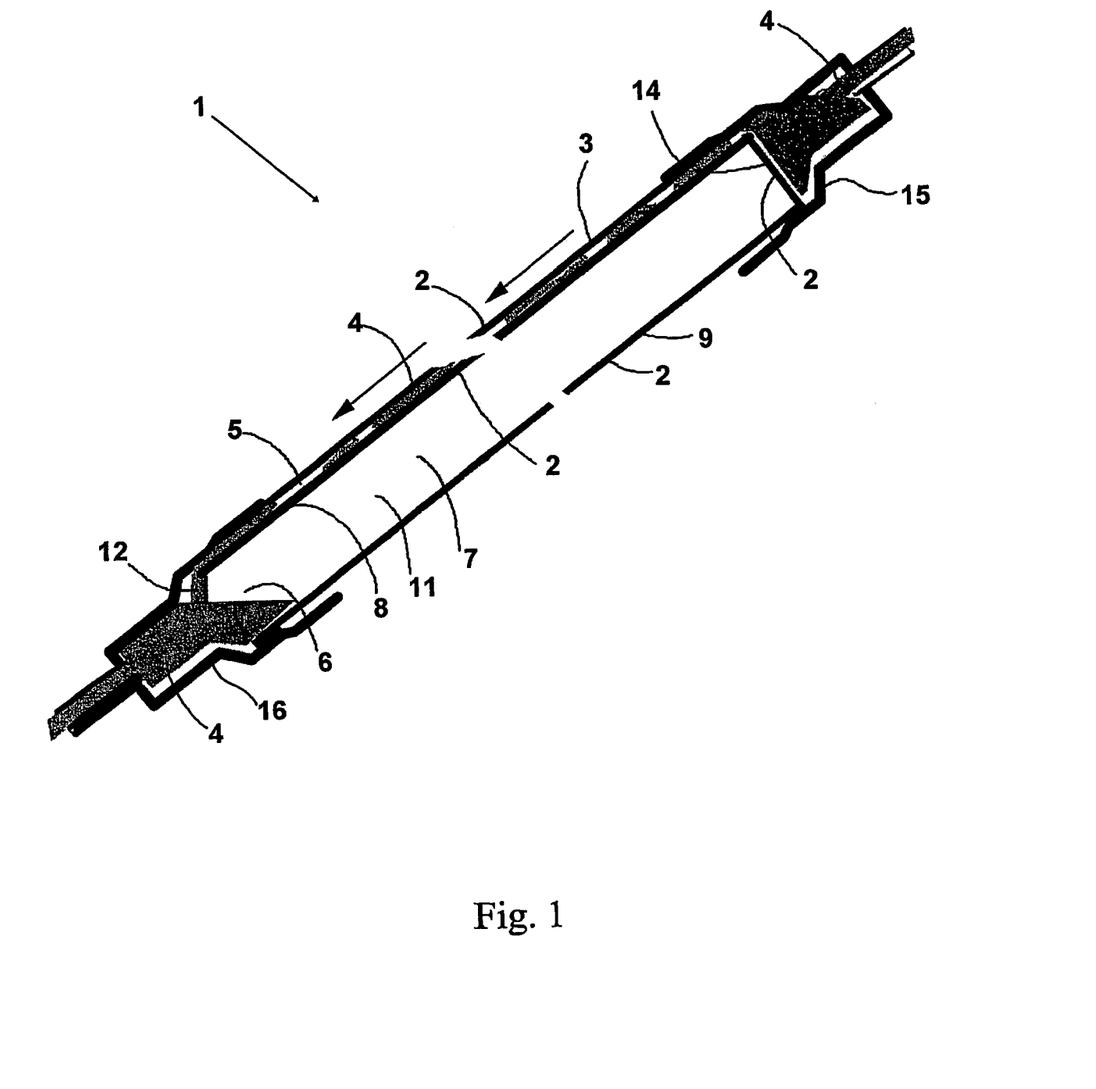
FIG. 1 shows a solar collector with a solar collector plate and operating mode in accordance with an embodiment of the invention using the capillary effect.
Figure 2:
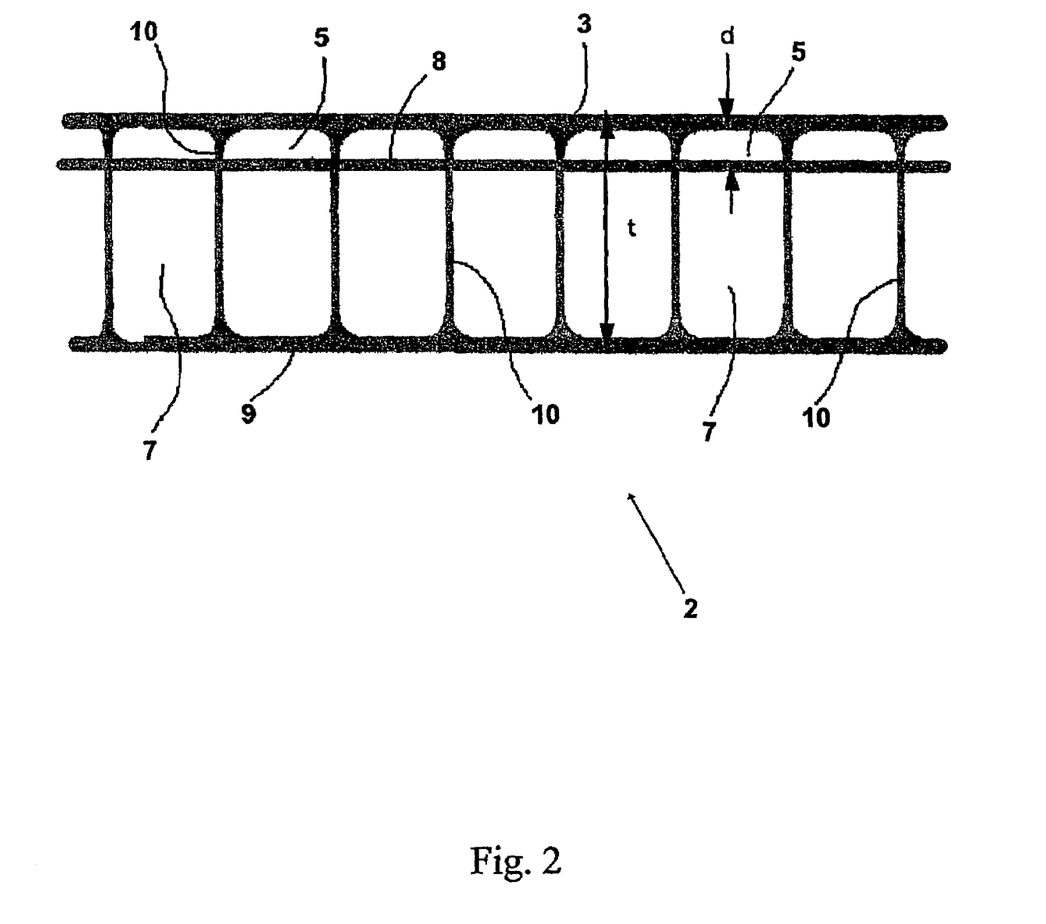
FIG. 2 shows a cross section through a solar collector plate in accordance with an embodiment of the invention.

While referring at the same time to FIGS. 1 and 2, we first discuss an embodiment of the invention that makes use of capillary forces, but it is at the same time pointed out that the same set-up will be comprised by the invention also if cross dimensions and inside surface structure in the channels 5 are such that capillary effects can be disregarded.

In FIG. 1 appears, in a section view from the side, a solar collector 1 with a solar collector plate 2 that is manufactured to work at the same time as a strong building board. A forward plane 3 is an absorber plane for receiving sunlight, and behind/underneath the absorber plane 3 there are channels 5 for transporting cooling liquid 4. Since heat is deposited in the surface that faces toward the sun, the construction of channels 5 in the plate must be so as to give the liquid 4 flowing therethrough, a maximum contact area against the underside of absorber plane 3. The channels 5 are provided between the absorber plane 3 and an intermediate plane 8 parallel to the absorber plane, and between raised support walls/separating walls 10. In FIG. 2, an example of the construction appears more clearly, and it appears there that the walls 10 run further down past the intermediate plane 8, ending only at a third plane 9 which is a rear strength plane parallel to planes 3 and 8. Hence, the construction constitutes a closed structure, as seen in the cross section view of FIG. 2. It appears that the walls 10 are parallel, they have equal intervals and equal thicknesses, they pass, as mentioned, "right through" the intermediate plane 8, and all of them stand perpendicularly to planes 3, 8 and 9. All of these characteristics can be varied: The intervals can be different from each other, the wall thicknesses may be different, the walls need not meet in alignment at plane 8, and they must not necessarily be perpendicular to planes 3, 8 and 9. However, it would not be favourable having walls that are parallel and inclined, because this would result in a weak construction that would easily collapse. If the walls 10 are skewed, they should have alternating directions to provide the necessary stiffness for the plate 2.

Cavities 7 are formed between the walls 10 and the planes 8 and 9, which cavities constitute a quite central feature of the invention. It appears from FIG. 1 that the cavities 7 are closed at the top by a closure wall 14, while they are kept open in the lower end, at reference numeral 6. The wall 14 can be attached by welding or gluing, or it may be constituted by gaskets.

At the inlet and outlet of the solar collector plate 2, at the upper and lower ends in FIG. 1, there are end channels 15 and 16 extending in a direction that is perpendicular to the drawing sheet, for distribution of liquid to all parallel channels 5 and collection of liquid from every channel 5. It appears that only the channels 5 make a connection between the upper end channel 15 and the lower end channel 16, since the wall 14 close the cavities 7 at their top end.

An air volume 11 in each cavity 7 can be closed off when liquid flows in or flows by at the lower end. FIG. 1 shows a liquid curtain 12 flowing downwards, which liquid curtain closes the cavities 7.

Such a liquid curtain 12 will be created easily when the channels 5 provide unobstructed flow during purely gravity-driven flow in a downward direction. If the flow is slower, the flow will have a character where water and air bubbles run alternatingly down in the channels. Due to capillary forces, the water will spread along the underside of the front plate. The air bubbles are of small importance for heat transfer. However, it must be taken care that the opening at the top where water flows in, is sufficiently narrowed so as to have water (and air) run through all channels.

In FIG. 1 appears just such a situation with capillary effect in the channels 5, which effect implies that liquid 4 is pulled downwards in a channel 5 without build-up of any static liquid pressure at the lower end. This is illustrated by the presence of small air or vapour bubbles between liquid sections in the shown channel. As air is pulled downward in the channels together with the water, and further out of the solar collector, pulled along by the outgoing water flow in lower end channel 16, a low pressure will build up inside the solar collector plate. This low pressure arises because the air that is expelled, is not replaced by new air. The low pressure will have the result that the water rises somewhat in the cavities 7, so that the cavities are closed to form a compressible expansion volume inside the solar collector plate.

FIG. 2 shows that the liquid transport channels 5 have a height d (in a direction perpendicular to the planes), while the corresponding height for the cavities 7 is given by the total thickness t for the solar collector plate 1, d and the bulk thickness of planes 8 and 9. The plate thickness t should be substantially greater than d, since the plate 2 should preferably have a stiffness to make it suitable as a building board.

Cooling liquid 4 is brought to the upper end channel, either by direct supply through an opening in the end channel, or through a (not shown) transport channel in the plate. The liquid will be distributed to all channels 5 in the plate that are open toward the upper end channel 15, and it will run, driven by gravity, down through the plate to the lower end channel 16. Contact with plane 3 results in that the heat that is deposited in this plane, is transferred to the liquid. A satisfactory function presupposes that there is a correct relation between height d and the friction exerted by the channel walls on the flowing liquid. This friction depends on the degree of wetting, the roughness of the surfaces constituting the channel, the liquid viscosity and the slant angle of the channel. When water is used as a cooling liquid, the capillary forces will dominate as long as the height d is smaller than about 2 mm, and the water velocity will then essentially be determined by supplied amount of water per unit time. The flow velocity should, if water is used as cooling liquid, be in the range 15-30 ml/s per m$^2$ absorber area.

The roughness of the surfaces in the liquid-conducting channels 5 can be influenced by (i) preparing the extrusion tool, or (ii) injecting a surface coat.

Figure 3:
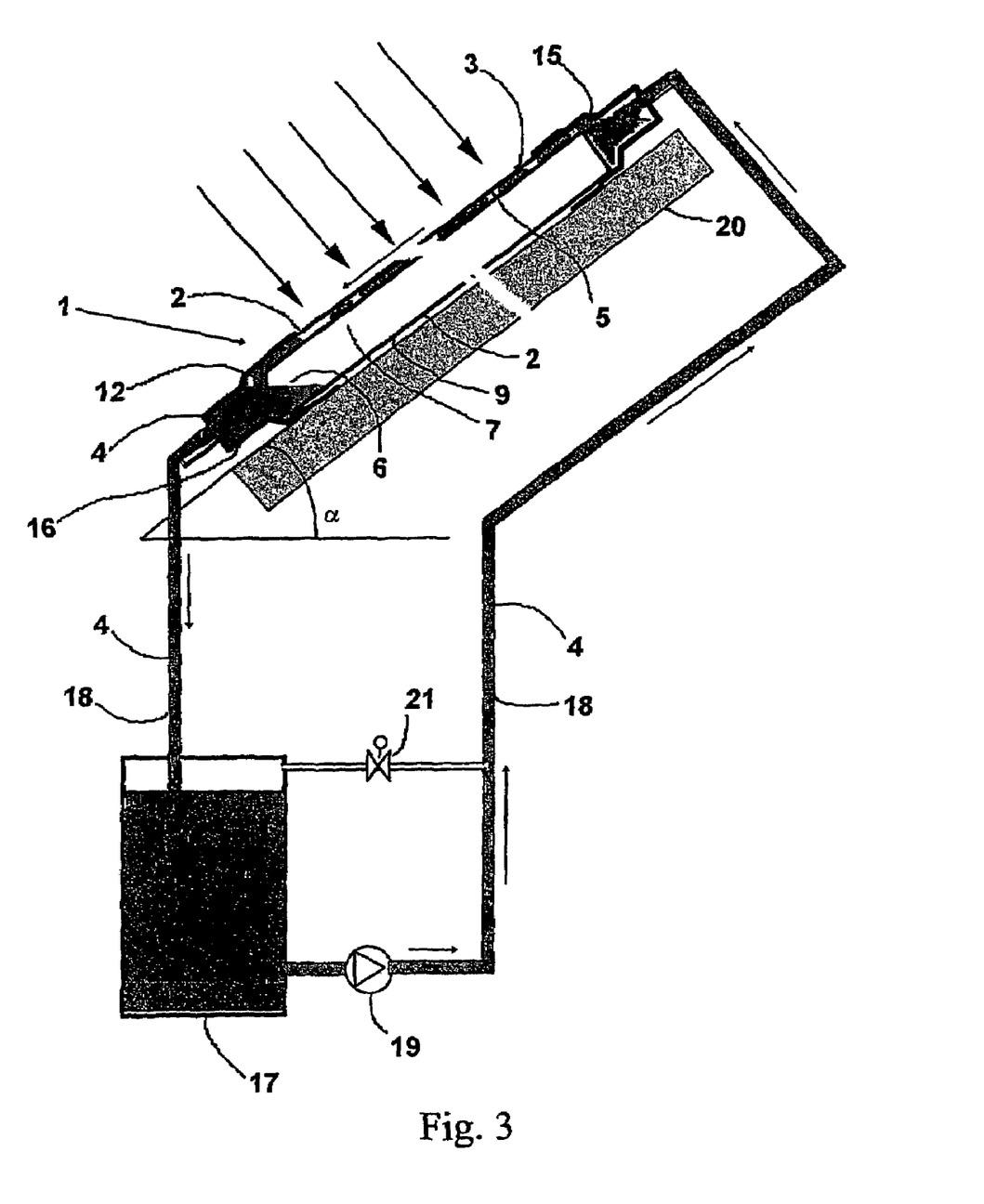
FIG. 3 shows the solar collector of FIG. 1, in operation and with an attached external liquid system.

The solar collector 1 will be mounted in such a manner that the channels 5 form an angle $\alpha$ to the horizontal plane. This slant angle $\alpha$ can be e.g. the slant angle of a roof facing toward the south, as shown in FIG. 3. The plate is then mounted in such a manner that the light-absorbing surface faces upward, while plane 9 rests on the roof (or on the insulation layer 20). The plate is closed at both ends by end channels 15, 16 that enclose the whole plate end, and that are attached and closed to the plate by welding, gluing or by using a gasket. Liquid is pumped up from a container 17, preferably constructed as a heat store, and the liquid 4 is returned to the same container after having passed through the liquid-conducting channels 5 in the plate. The liquid-conducting pipes 18 between the plate and the container have dimensions to provide a sufficient liquid velocity (i.e. about 1 m/s or higher) to drive air out of the pipe system and to the container. This is necessary to avoid annoying noise when liquid circulates in the system. The container 17 is preferably arranged at a lower level than the solar collector, so that when the circulation pump 19 stops, air will flow up into the plate 2, and liquid 4 will run back to the container 17. This function is important to safeguard against a situation where the liquid freezes or starts to boil inside plate 2. A pipe between the top part of container 17 and pipe 18 comprises a discharge valve 21.

If the container 17 maintains atmospheric pressure, there will, at the moment when the pump 19 stops, and before air is possibly admitted, be established a pressure inside the plate 2 that is equal to the atmospheric pressure minus a liquid pressure represented by the difference in level between plate 2 and container 17. Hence, if water is used as cooling liquid, and this level difference is about 10 m, a near vacuum will arise in the plate, and a pressure difference between the inside and the outside of the plate of about 100 kPa. Combined with a high temperature (more than 100° C.), such pressure differences will represent a stress that will weaken the plastic material over time, in view of the small wall thicknesses that are used in plate 2. Pressure changes arise immediately when the pump 19 stops, and such sudden pressure changes with the possibility of pressure oscillations as a consequence of possible resonance phenomena in the circulation circuit, will represent special strains in the plate structure.

The cavities 7 in plate 2, which cavities are closed at the top end, will oppose these strains. When circulation takes place in the circuit, these cavities are filled by air. In this phase, the pressure in the cavities 7 is equal to $$p = p_o - \rho g h + p_f$$

where $p_o$ is the atmospheric pressure, $\rho g h$ is the pressure due to a liquid column in the return pipe, and $p_f$ is the pressure due to friction between the flowing liquid and the pipe wall. At the moment when the pump stops, $p_f$ will become zero, and the pressure drop will then be opposed by the fact that the air in the cavities 7 expand and fill the pipes by air, so as to reduce the static liquid pressure. This pressure-moderating effect of the air-filled cavities will reduce the strains on plate 2, and hence contribute to increase the lifetime of the solar collector.

Figure 4:
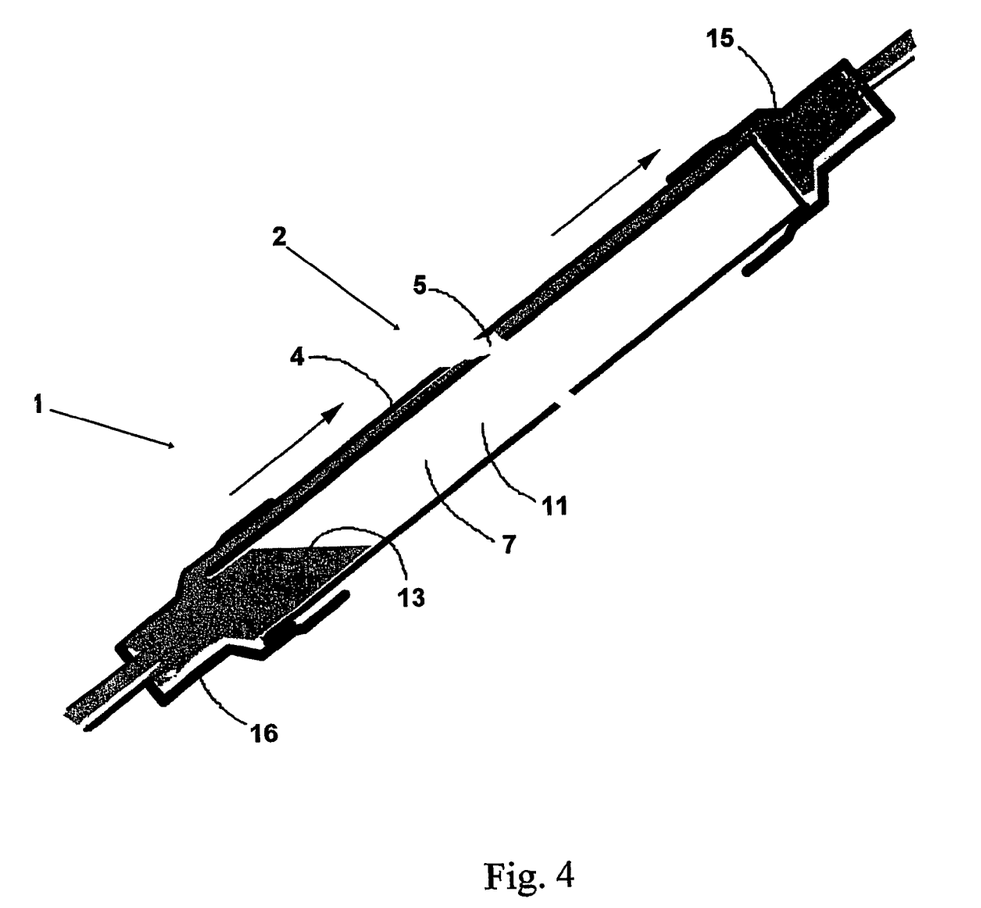
FIG. 4 shows a cross section through the same solar collector as in FIG. 1, however with an operating mode in accordance with an embodiment with upward directed flow for the cooling liquid.
Figure 5:
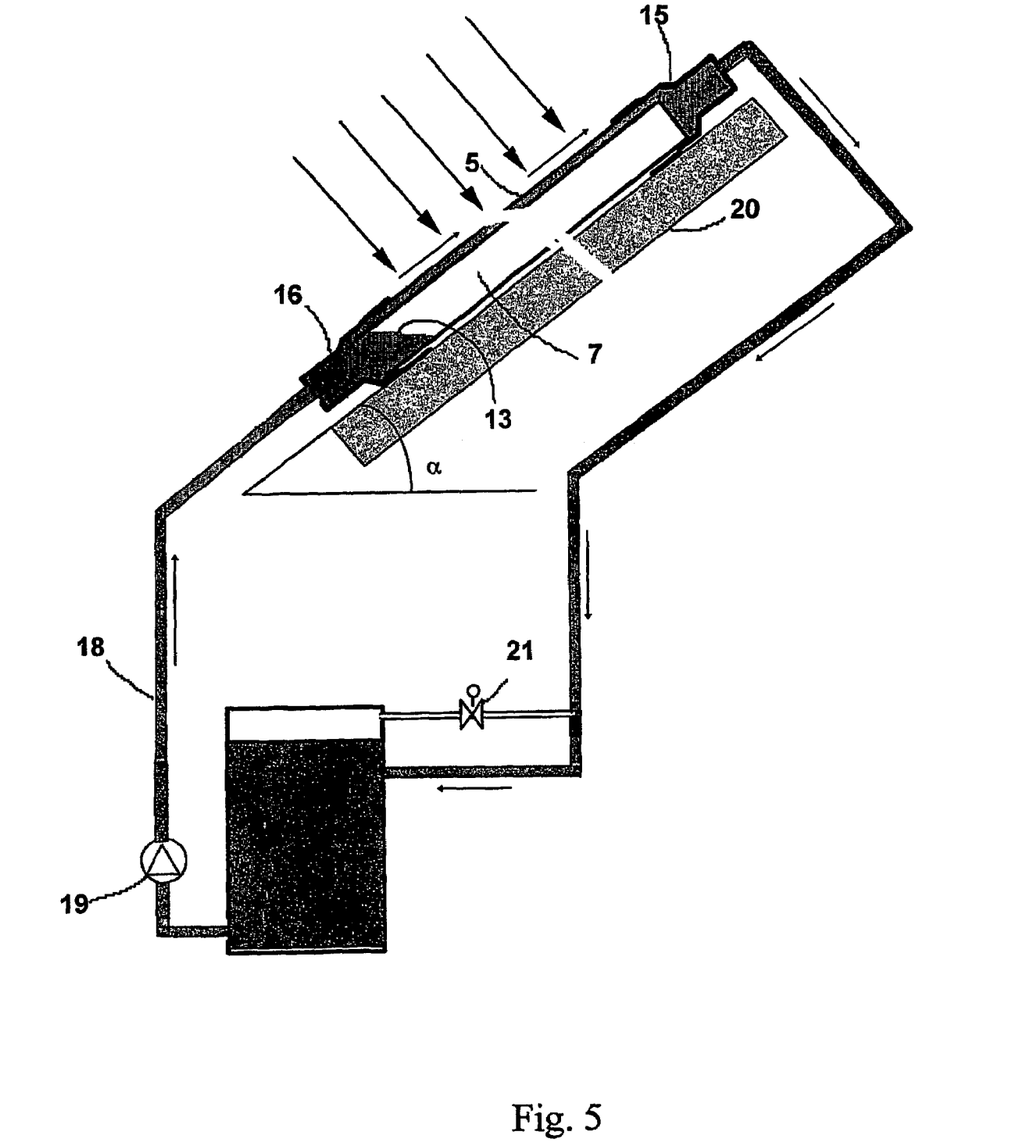
FIG. 5 shows the solar collector of FIG. 4 in operation and with an attached external liquid system.

In FIGS. 4 and 5 appears a situation where (in principle) the same solar collector 2 is used in such a manner that cooling liquid 4 is pumped in at the bottom of the plate to flow upward in the liquid-conducting channels 5 to the upper end channel 15. Such a flow direction is possible if the difference of level between the upper and lower end channels is not greater than that the liquid pressure established thereby, does not exceed the sustaining limit of the plate under prevailing temperature conditions. The level, and hence the liquid pressure is determined by the plate length and by the slant angle formed by plate 2 with the horizontal. The advantage of this circulation direction is that the liquid 4 will fill all liquid-conducting channels 5, independent of the movement velocity. Thereby, flow velocity can be reduced relative to the above stated 15-30 ml/s m², with the consequence that pump power and possibly pipe dimensions can be reduced.

This flow direction represents a somewhat larger risk of rapid pressure changes than the opposite flow direction, because the whole pipe plant and all channels 5 in plate 2 are completely filled by liquid. The top-closed cavities 7 in the plate are now part filled with air, since the air is initially compressed by a liquid amount 13 that constitutes an "eddying" of the flow that actually runs in the channels 5, so that the pressure corresponds to the atmospheric pressure plus the liquid column represented by the level difference between the upper and lower end channels in the plate. When the pump 19 stops, the pressure in plate 2 will immediately drop corresponding to the pressure represented by the liquid column between container 17 and lower end channel 16. Even if a back pressure valve is installed in the go pipe, pressure variations may arise in the same order of magnitude, with a consequential risk of damaging plate 2. The air in the cavities 7 that are closed at the top, will, similarly to the case that was described above, represent a pressure-stabilizing and pressure-moderating factor.

Regarding manufacture of the solar collector plate 2, the preferred method is extrusion. The material is preferably a temperature and water resistant plastic material, for instance polypropylene, polyphenyloxide, modified PPO-materials like Noryl or similar, polycarbonate etc. The extruder nozzle that is used, may at the end thereof be equipped with a tool providing for roughening of the inside surfaces in the channels 5, if the solar collector shall be operated along a principle of assistance by capillary effect. Roughened surfaces may provide improved capillary effect. Alternatively, it will be possible to inject a coating after extrusion, which coating will provide a rough surface when dry.

After extrusion and cutting of the extrudate to provide solar collector plates with suitable dimensions, the end closure wall 14 is attached using a suitable method of attachment (glue, welding, nailing etc.) for closing the cavities 7. Optionally it will be possible to press in one or several adapted gaskets to constitute wall 14.

The invention claimed is:

1. A solar collector plate for a solar collector, said solar collector plate comprising:
   a radiation-receiving absorber plane having an exposed front surface,
   cooling liquid transport channels which extend behind and in direct contact with a rear surface of the absorber plane, and
   at least one cavity with only one open end, wherein the open end is in fluid communication with the cooling liquid transport channels at any one of a cooling liquid inlet to and a cooling liquid outlet from said solar collector plate, and wherein the at least one cavity is an integrated part of, and disposed behind, the cooling liquid transport channels.

2. The solar collector plate of claim 1, wherein said collector plate is a stiff and uniform plate with the internally integrated cooling liquid transport channels.

3. The solar collector plate of claim 2, wherein said collector plate is constructed with three material main planes in parallel, namely the absorber plane, an intermediate plane and a rear strength plane, as well as parallel walls arranged perpendicularly therebetween, which parallel walls provide said channels between the parallel walls and between the absorber plane and the intermediate plane, said parallel walls constituting supporting walls between the intermediate plane and the strength plane and forming said cavities, which cavities run in parallel with said channels, said parallel walls defining a longitudinal direction for said solar collector plate, which longitudinal direction is the same as the transport direction of the cooling liquid.

4. The solar collector plate of claim 3, wherein the open end of the cavities is arranged at the inlet to the solar collector plate for the cooling liquid transport channels, and the plate is adapted to be arranged in a slanted position with said inlet lowest, for an operating mode with upward directed and pumped liquid transport, and the cavities are adapted to receive, in a lower part thereof, an eddying part of cooling liquid.

5. The solar collector plate of claim 3, wherein said collector plate is extruded and made from a temperature and water resistant plastic material.

6. The solar collector plate of claim 3, wherein the cross section dimensions and the inside surface structure of the cooling liquid transport channels are adapted for providing a capillary effect, for use in capillary effected assisted gravity flow of the cooling liquid through the channels when the solar collector plate is arranged with the channels in a downward slanting position and with the open end of the cavities lowest, a cooling liquid being let in at an upper edge and closing the lower open end of the cavities by means of a liquid curtain.

7. The solar collector plate of claims 5 or 6, wherein the channels have inside surfaces that have been roughened in a special finishing step in an extrusion process.

8. The solar collector plate of claims 5 or 6, wherein the channels have inside surfaces having being roughened by injecting a surface coating after extrusion of the plate.

9. A method for safeguarding the operation of a solar collector that includes providing a solar collector plate having a radiation receiving absorber plane having an exposed front surface, in which solar radiation energy is converted to thermal energy that is absorbed by a cooling liquid flowing through the solar collector plate, said solar collector plate having cooling liquid transport channels which extend behind and in direct contact with a rear surface of said absorber plane, wherein the flowing cooling liquid is in fluid communication with at least one cavity having only one open end, and caused, in operation, to close off the open end of said at least one cavity, and an air volume, closed off thereby in said at least one cavity, dampens possible kickbacks and pressure transients in the cooling liquid, and wherein the at least one cavity is an integrated part of, and disposed behind, the cooling liquid transport channels.

10. The method of claim 9, wherein the cooling liquid closes off cavities that constitute an internal and integrated section of a stiff and the solar collector plate having internally integrated cooling liquid transport channels in front of said cavities.

11. The method of claim 10, wherein said solar collector is arranged with a slanted solar collector plate and with inlet lowest to, and outlet at the top from, said cooling liquid transport channels, that the cooling liquid is transported upward in the channels by pumping, and that the cavities behind the channels are then closed off by an eddying part of the cooling liquid.

12. The method of claim 10, wherein the solar collector is arranged with a slanting solar collector plate and with inlet at the top to, and an outlet lowest from, said cooling liquid transport channels, and that the cavities behind the channels are closed by means of a gravity-driven liquid curtain at the outlet.

13. The method of claim 12, wherein the flowing cooling liquid in the channels is transported down toward the outlet by capillary effect assisted gravity, said channels having been provided with a capillary effect by cross section dimensioning and surface preparation internally.

* * * * *